United States Patent
Olson et al.

(10) Patent No.: US 6,326,420 B1
(45) Date of Patent: Dec. 4, 2001

(54) PIGMENT DISPERSIONS CONTAINING DISPERSANTS PREPARED BY CONTROLLED RADICAL POLYMERIZATION

(75) Inventors: Kevin C. Olson, Gibsonia; Simion Coca, Pittsburgh; James B. O'Dwyer, Valencia; Karl F. Schimmel, Verona, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/464,947

(22) Filed: Dec. 16, 1999

(51) Int. Cl.$^7$ ........................................................ C08L 3/00
(52) U.S. Cl. .......................... 523/334; 524/560; 524/565; 524/566; 524/558
(58) Field of Search .................................... 523/177, 334, 523/335, 560, 501; 524/560, 565, 566, 558

(56) References Cited

U.S. PATENT DOCUMENTS

| | | | |
|---|---|---|---|
| 4,508,880 | 4/1985 | Webster | 526/190 |
| 4,554,307 | * 11/1985 | Farrar et al. | 524/425 |
| 4,656,226 | 4/1987 | Hutchins et al. | 525/93 |
| 4,755,563 | 7/1988 | West | 525/287 |
| 4,812,517 | 3/1989 | West | 525/94 |
| 5,085,698 | 2/1992 | Ma et al. | 106/20 |
| 5,219,945 | 6/1993 | Dicker et al. | 525/276 |
| 5,221,334 | 6/1993 | Ma et al. | 106/20 D |
| 5,272,201 | 12/1993 | Ma et al. | 524/505 |
| 5,478,886 | 12/1995 | Kim | 525/94 |
| 5,763,548 | 6/1998 | Matyjaszewki et al. | 526/135 |
| 5,789,487 | 8/1998 | Matyjaszewski et al. | 545/301 |
| 5,807,937 | 9/1998 | Matyjaszewski et al. | 526/135 |
| 5,859,113 | 1/1999 | McIntyre et al. | 524/460 |

FOREIGN PATENT DOCUMENTS

| | | |
|---|---|---|
| WO 96/30421 | 10/1996 | (WO) . |
| WO 97/18247 | 5/1997 | (WO) . |
| WO 98/01480 | 1/1998 | (WO) . |
| WO 98/40415 | 9/1998 | (WO) . |

* cited by examiner

Primary Examiner—Edward J. Cain
Assistant Examiner—Katarzyna Wyrozebski-Lee
(74) Attorney, Agent, or Firm—William J. Uhl; James R. Franks

(57) ABSTRACT

A pigment dispersion which includes a pigment, an aqueous carrier and a pigment dispersant. The pigment dispersant is prepared by controlled radical polymerization initiated in the presence of a monomeric initiator having at least two radically transferable groups. The pigment dispersant has at least one of the following polymer chain structures:

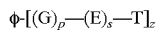

and

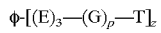

where G is a hydrophobic residue of at least one radically polymerizable ethylenically unsaturated monomer; E is a hydrophilic residue of at least one radically polymerizable ethylenically unsaturated monomer; φ is a residue of or derived from the initiator, and is free of the radically transferable group; T is or is derived from the radically transferable group of the initiator; z is 2 to 10; p and s are at least one and are selected such that the pigment dispersant has a number average molecular weight of at least 500.

26 Claims, No Drawings

PIGMENT DISPERSIONS CONTAINING DISPERSANTS PREPARED BY CONTROLLED RADICAL POLYMERIZATION

FIELD OF THE INVENTION

The present invention relates to pigment dispersions containing pigment, an aqueous carrier, and a pigment dispersant. The pigment dispersant is prepared by controlled radical polymerization in the presence of a monomeric initiator having at least two radically transferable groups. The pigment dispersant contains hydrophilic monomer residues and hydrophobic monomer residues.

BACKGROUND OF THE INVENTION

Pigmented coating compositions are used in a wide variety of applications including, for example, corrosion resistant primers and decorative topcoats in the automotive, industrial and appliance markets. The preparation of pigmented coating compositions generally involves mixing binder resin(s), crosslinker(s), additives, e.g., flow additives, and solvents with a compatible pigment dispersion. Pigment dispersions are typically prepared by mixing dry pigment with a pigment dispersant in the presence of a carrier medium, e.g., an aqueous carrier medium.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Reducing the environmental impact of pigmented coatings compositions, in particular that associated with emissions into the air of volatile organics during their use, has been an area of ongoing investigation and development in recent years. Accordingly, interest in aqueous pigment dispersions has been increasing due, in part, to the inherently low volatile organic content (VOC) of the aqueous pigmented coatings prepared therefrom, which can significantly reduce air emissions during the application process.

Pigment dispersants used in aqueous pigment dispersions are preferably compatible with both the aqueous carrier medium and the hydrophobic surfaces of the pigment particles. Such a combination of disparate properties can be achieved with a pigment dispersant having distinct hydrophobic and hydrophilic polymeric segments or portions, i.e., having well defined polymer chain architecture. A wide variety of radically polymerizable monomers, such as methacrylate and acrylate monomers, are commercially available and can provide a wide range of properties including, for example, hydrophilic and hydrophobic properties. The use of conventional, i.e., non-living or free, radical polymerization methods to synthesize pigment dispersants provides little control over molecular weight, molecular weight distribution and, in particular, polymer chain structure. Aqueous pigment dispersions containing pigment dispersants prepared by conventional non-living radical polymerizations, typically have poor stability, e.g., the pigments re-agglomerate and/or settle out of the dispersion, and are unsuitable for the preparation of aqueous pigmented coatings compositions.

The continued development of aqueous pigment dispersions that are stable and suitable for the preparation of aqueous pigmented coating compositions is desirable. In particular, it would be desirable to develop aqueous pigment dispersions that comprise pigment dispersants having well defined polymer chain architecture in which distinct hydrophilic and hydrophobic polymer segments or portions are present.

U.S. Pat. Nos. 5,807,937, 5,789,487 and 5,763,548, and International Patent Publication No.'s WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 and '548 patents also describe (co)polymers prepared by ATRP, which are useful in a wide variety of applications including, for example, dispersants and surfactants.

SUMMARY OF THE INVENTION

In accordance with the present invention, there is provided a pigment dispersion comprising:

(a) pigment;

(b) an aqueous carrier selected from water and a mixture of water and at least one organic solvent; and (c) a pigment dispersant prepared by controlled radical polymerization in the presence of a monomeric initiator having at least two radically transferable groups, and in which said pigment dispersant has a polymer chain structure selected from at least one of the following representative general formulas I and II,

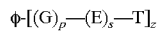          I and

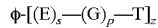          II wherein G is a hydrophobic residue of at least one radically polymerizable ethylenically unsaturated monomer; E is a hydrophilic residue of at least one radically polymerizable ethylenically unsaturated monomer; φ is a residue of or derived from said initiator, and is free of said radically transferable group; T is or is derived from said radically transferable group of said initiator; z is independently for each structure a number from 2 to 10 (e.g., 2, 3, 4, 5, 6, 7, 8, 9 or 10); p and s represent average numbers of residues occurring in a block of residues; p and s are each selected independently for each structure such that said pigment dispersant has a number average molecular weight of at least 500.

Other than in the operating examples, or where otherwise indicated, all numbers or expressions referring to quantities of ingredients, reaction conditions, etc, used in the specification and claims are to be understood as modified in all instances by the term "about."

DETAILED DESCRIPTION OF THE INVENTION

Pigment dispersions according to the present invention comprise a pigment dispersant as represented by general formulas I and II. The polymer chain segments of the pigment dispersant represented by —$(G)_p$—$(E)_s$—T in general formula I, and —$(E)_s$—$(G)_p$—T in general formula II may be described as arms that extend out from a residue of or derived from the monomeric initiator. Each arm of the pigment dispersant contains a hydrophobic segment, for example as represented by —$(G)_p$—, and a hydrophilic segment, for example as represented by —$(E)_s$—. While not intending to be bound by any theory, it is believed that the hydrophilic segments of the arms of the pigment dispersant are associated with the aqueous carrier, while the hydrophobic segments of the arms are associated with the pigment of the pigment dispersion.

As used herein and in the claims, the terms "hydrophobic" and "hydrophilic" are relative to each other. Within an arm of the pigment dispersant, the hydrophobic segment is more hydrophobic than the hydrophilic segment. Correspondingly, within an arm of the pigment dispersant, the hydrophilic segment is more hydrophilic than the hydrophobic segment.

A more quantitative measure of the hydrophobic or hydrophilic nature of a nonionic monomer residue can be obtained by using the following Formula-A: 100×(oxygen weight+ nitrogen weight)/(carbon weight). Monomer residues having calculated Formula-A values of greater magnitude are generally considered to be more hydrophilic than monomer residues having calculated Formula-A values of lesser magnitude. For example, the calculated Formula-A value is 67 for 2-hydroxyethyl methacrylate; 63 for methacrylamide; 53 for methyl methacrylate; 33 for butyl methacrylate; and 22 for 2-ethylhexyl methacrylate. Accordingly, an average Formula-A value can be calculated for a polymer chain segment or portion by averaging the calculated Formula-A values for the monomer residues within that segment.

In an embodiment of the present invention, and with reference to general formulas I and II, within an arm of the pigment dispersant, the hydrophilic polymer chain segment —$(E)_s$— has a calculated average Formula-A value of from 55 to 133, while the hydrophobic polymer chain segment —$(G)_p$— has a calculated average Formula-A value of from 10 to less than 55, e.g., from 10 to 40 or from 10 to 33. Within an arm of the pigment dispersant, the difference between the calculated Formula-A values of the hydrophilic polymer chain segment and hydrophobic polymer chain segment is typically at least 10, e.g., at least 25, and typically within the range of 10 to 40, inclusive of the recited values.

The hydrophobic polymer chain segment within an arm of the pigment dispersant typically does not contain ionic monomer residues. The hydrophilic polymer chain segment within an arm of the pigment dispersant may contain ionic monomer residues, nonionic monomer residues (e.g., having calculated Formula-A values of from 55 to 133) or a combination of ionic and nonionic monomer residues.

The pigment dispersant is prepared by controlled radical polymerization. As used herein and in the claims, the term "controlled radical polymerization," and related terms, e.g., "living radical polymerization," refer to those methods of radical polymerization that provide control over the molecular weight, polymer chain architecture and polydispersity of the resulting polymer. A controlled or living radical polymerization is also described as a chain-growth polymerization that propagates with essentially no chain transfer and essentially no chain termination. The number of living polymer chains formed during a controlled radical polymerization is often nearly equal to the number of radically transferable groups (e.g., a multiple of the number of monomeric initiators and the number of radically transferable groups per monomeric initiator) present at the beginning of the reaction. Each living polymer chain typically contains a residue of the initiator at what is commonly referred to as its tail, and a residue of the radically transferable group at what is commonly referred to as its head.

In an embodiment of the present invention, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In the present invention, the initiation system comprises: a monomeric initiator having at least two radically transferable atoms or groups; a transition metal compound, i.e., a catalyst, which participates in a reversible redox cycle with the initiator; and a ligand, which coordinates with the transition metal compound. The ATRP process is described in further detail in international patent publication WO 98/40415 and U.S. Pat. Nos. 5,807,937, 5,763,548 and 5,789,487.

Catalysts that may be used in the ATRP preparation of the pigment dispersant, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula III, $$TM^{n+}X_n \qquad \qquad III$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$–$C_6$-alkoxy, cyano, cyanato, thiocyanato and azido. A preferred transition metal is Cu(I) and X is preferably halide, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, $Cu(II)Cl_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. As used herein and in the claims, the term "(meth)acrylate" and similar terms refer to acrylates, methacrylates, and mixtures of acrylates and methacrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having at least two radically transferable groups. The radically transferable groups of the monomeric initiator may be selected from, for example, cyano, cyanato, thiocyanato, azido, halide groups and combinations thereof. Preferably, the radically transferable groups of the monomeric initiator are selected from halide groups, e.g., chloride, bromide and iodide. The monomeric initiator may also be substituted with functional groups, e.g., oxyranyl groups, such as glycidyl groups. Additional useful initiators are described in U.S. Pat. No. 5,807,937 at column 17, line 4 through column 18, line 28.

The monomeric initiator may be selected from methylenedihalide, e.g., methylenedichloride and methylenedibromide; haloform, e.g., chloroform; carbon tetrahalide, e.g., carbon tetrachloride; di through hexakis(α-halo-$C_1$–$C_6$-alkyl)benzene, e.g., di(chloromethyl)benzene, di(1-chloroethyl)benzene, tetrakis(chloromethyl)benzene, tetrakis(bromomethyl)benzene and hexakis(chloromethyl) benzene; and 2,2-bis(halomethyl)-1,3-dihalopropane, e.g., 2,2-bis(chloromethyl)-1,3-dichloropropane and 2,2-bis (bromomethyl)-1,3-dibromopropane; $C_1$–$C_6$ linear or branched alkyl ester of alpha-polyhalo (i.e., dihalo and trihalo) $C_2$–$C_6$ carboxylic acid, e.g., methyl dichloroacetate and methyl trichloroacetate; and mixtures thereof.

The monomeric initiator may also be selected from one or more initiators represented by the following general formula IV,

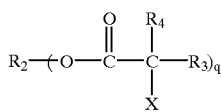

IV

In general formula IV, $R_2$ is the residue of a polyol having from 2 to 10 hydroxy groups; X is halide; $R_3$ and $R_4$ are each independently selected from hydrogen, $C_1$–$C_{20}$ linear or branched alkyl groups, e.g., methyl, ethyl, propyl, butyl, hexyl, octyl, nonyl, decyl, dodecyl and icosanyl, aryl groups, e.g., phenyl, and polycyclic aromatic groups, e.g., naphthalenyl and anthracenyl; and q is a number from 2 to the number of hydroxy groups of the polyol, e.g., 2, 3, 4, 5, 6, 7, 8, 9 or 10. The monomeric initiator may be selected from mixtures of initiators represented by general formula IV and those initiators recited previously herein.

In an embodiment of the present invention, the polyol of which $R_2$ is a residue in general formula IV, may be selected from alkylene glycol, e.g., ethylene glycol, propylene glycol, butylene glycol and pentylene glycol; di through penta(alkylene glycols), e.g., di-, tri-, tetra- and penta (ethylene glycols) and di through penta(propylene glycols); trimethylolpropane; trimethylolethane; di-trimethylolpropane; di-trimethylolethane; pentaerythritol; di-pentaerythritol; and mixtures thereof. With further reference to general formula IV, $R_3$ and $R_4$ are each preferably and independently selected from hydrogen and a $C_1$–$C_4$ alkyl group, and X is chlorine or bromine. As used herein and in the claims, the term "monomeric initiator" is meant to be distinguishable from polymeric initiators, such as polyethers, polyurethanes, polyesters and acrylic polymers having radically transferable groups.

In the ATRP preparation the pigment dispersant, the amounts and relative proportions of monomeric initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the pigment dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5 \times 10^{-2}$:1.

In preparing the pigment dispersant by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Generally, the pigment dispersant is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937 at column 21, line 44 through column 22, line 54.

The ATRP preparation of the pigment dispersant is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

The ATRP transition metal catalyst and its associated ligand are typically separated or removed from the pigment dispersant prior to its use in the pigment dispersions of the present invention. Removal of the ATRP catalyst may be achieved using known methods, including, for example, adding a catalyst binding agent to a mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

With reference to general formulas I and II, G and E may each be residues of monomers independently selected from vinyl monomers, allylic monomers, olefins and mixtures thereof. Classes of vinyl monomers of which G and E may each independently be residues of and that may be used to prepare the pigment dispersant, include, but are not limited to, (meth)acrylic acid, (meth)acrylates, (meth)acrylamide, N- and N,N-disubstituted (meth)acrylamides, vinyl aromatic monomers, vinyl halides and vinyl esters of carboxylic acids. As used herein and in the claims, the term "(meth) acrylate" and similar terms refer to acrylates, methacrylates and mixtures of acrylates and methacrylates.

Examples of $C_1$–$C_{20}$ alkyl (meth)acrylates (including linear or branched alkyls and cycloalkyls) of which G and E may each independently be residues of, include, but are not limited to, methyl (meth)acrylate, ethyl (meth)acrylate, propyl (meth)acrylate, isopropyl (meth)acrylate, n-butyl (meth) acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate, 3,3,5-trimethylcyclohexyl (meth)acrylate and isocane (meth) acrylate. Examples of oxirane functional (meth)acrylates of which G and E may each independently be residues of include, but are not limited to, glycidyl (meth)acrylate, 3,4-epoxycyclohexylmethyl(meth)acrylate, and 2-(3,4-epoxycyclohexyl)ethyl(meth)acrylate.

Hydroxy alkyl (meth)acrylates having from 2 to 4 carbon atoms in the alkyl group of which G and E may each independently be residues of include, but are not limited to, hydroxyethyl (meth)acrylate, hydroxypropyl (meth)acrylate and hydroxybutyl (meth)acrylate. In general formulas I and II, G and E may each independently be residues of monomers having more than one (meth)acryloyl group, such as (meth)acrylic anhydride, diethyleneglycol bis(meth) acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers that may be used to prepare the pigment dispersant include, but are not limited to, styrene, p-chloromethylstyrene, divinyl benzene, vinyl naphthalene and divinyl naphthalene. Vinyl halides that may be used to prepare the pigment dispersant include, but are not limited to, vinyl chloride and vinylidene fluoride. Vinyl esters of carboxylic acids that may be used to prepare the pigment dispersant include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins that may be used to prepare the pigment dispersant include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula V,

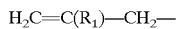

$H_2C=C(R_1)-CH_2-$      V wherein $R_1$ is hydrogen, halogen or a $C_1$ to $C_4$ alkyl group. Most commonly, $R_1$ is hydrogen or methyl and consequently general formula V represents the (meth)allyl radical (i.e., the methallyl or allyl radical). Examples of allylic monomers of which G and E may each independently be residues of include, but are not limited to: (meth)allyl ethers, such as methyl (meth)allyl ether and (meth)allyl glycidyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers that may be used to prepare the pigment dispersant include, but are not limited to: cyclic anhydrides, e.g., maleic anhydride, 1-cyclopentene-1,2-dicarboxylic anhydride and itaconic anhydride; esters of acids that are unsaturated but do not have $\alpha,\beta$-ethylenic unsaturation, e.g., methyl ester of undecylenic acid; diesters of ethylenically unsaturated dibasic acids, e.g., di($C_1$–$C_4$ alkyl)ethyl maleates; maleimide and N-substituted maleimides.

In an embodiment of the present invention, G is a hydrophobic residue of a monomer selected from oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates, e.g., including those as previously recited herein; aromatic (meth)acrylates, e.g., phenyl (meth)acrylate, p-nitrophenyl (meth)acrylate and benzyl (meth)acrylate; polycyclicaromatic (meth)acrylates, e.g., 2-naphthyl (meth)acrylate; vinyl esters of carboxylic acids, e.g., hexanoic acid vinyl ester and decanoic acid vinyl ester; N,N-di($C_1$–$C_8$ alkyl) (meth)acrylamides; maleimide; N—($C_1$–$C_{20}$ alkyl) maleimides; N—($C_3$–$C_8$ cycloalkyl) maleimides; N-(aryl) maleimides; and mixtures thereof. Examples of N-substituted maleimides include, but are not limited to, N—($C_1$–$C_{20}$ linear or branched alkyl) maleimides, e.g., N-methyl maleimide, N-tertiary-butyl maleimide, N-octyl maleimide and N-icosane maleimide; N—($C_3$–$C_8$ cycloalkyl) maleimides, e.g., N-cyclohexyl maleimide; and N-(aryl) maleimides, e.g., N-phenyl maleimide, N—($C_1$–$C_9$ linear or branched alkyl substituted phenyl) maleimide, N-benzyl maleimide and N—($C_1$–$C_9$ linear or branched alkyl substituted benzyl) maleimide.

The oxirane functional monomer or its residue that is reacted with a carboxylic acid, and of which G may be a residue, may be selected from, for example, glycidyl (meth) acrylate, 3,4-epoxycyclohexylmethyl(meth)acrylate, 2-(3,4-epoxycyclohexyl)ethyl(meth)acrylate, allyl glycidyl ether and mixtures thereof. Examples of carboxylic acids that may be reacted with the oxirane functional monomer or its residue include, but are not limited to, para-nitrobenzoic acid, hexanoic acid, 2-ethyl hexanoic acid, decanoic acid, undecanoic acid and mixtures thereof.

With reference to general formulas I and II, E may have nonionic moieties, ionic moieties and combinations thereof. In an embodiment of the present invention, E is a residue of a monomer selected from, for example, poly(alkylene glycol) (meth)acrylates; $C_1$–$C_4$ alkoxy poly(alkylene glycol) (meth)acrylates; hydroxyalkyl (meth)acrylates having from 2 to 4 carbon atoms in the alkyl group; N-(hydroxy $C_1$–$C_4$ alkyl) (meth)acrylamides (e.g., N-hydroxymethyl (meth) acrylamide and N-(2-hydroxyethyl) (meth)acrylamide); N,N-di-(hydroxy $C_1$–$C_4$ alkyl) (meth)acrylamides (e.g., N,N-di(2-hydroxyethyl) (meth)acrylamide); carboxylic acid functional monomers; salts of carboxylic acid functional monomers; amine functional monomers; salts of amine functional monomers; and mixtures thereof.

Poly(alkylene glycol) (meth)acrylates and $C_1$–$C_4$ alkoxy poly(alkylene glycol) (meth)acrylates of which E may be a residue are prepared by known methods. For example, (meth)acrylic acid or hydroxyalkyl (meth)acrylate, e.g., 2-hydroxyethyl (meth)acrylate, may be reacted with one or more alkylene oxides, e.g., ethylene oxide, propylene oxide and butylene oxide. Alternatively, an alkyl (meth)acrylate may be transesterified with a $C_1$–$C_4$ alkoxy poly(alkylene glycol), e.g., methoxy poly(ethylene glycol). Examples of preferred poly(alkylene glycol) (meth)acrylates and $C_1$–$C_4$ alkoxy poly(alkylene glycol) (meth)acrylates include, poly (ethylene glycol) (meth)acrylate and methoxy poly(ethylene glycol) (meth)acrylate, the poly(ethylene glycol) moiety of each having a molecular weight of from 100 to 800. An example of a commercially available $C_1$–$C_4$ alkoxy poly (alkylene glycol) (meth)acrylate is methoxy poly(ethylene glycol) 550 methacrylate monomer from Sartomer Company, Inc.

Examples of carboxylic acid functional monomers of which E may be a residue include, but are not limited to, (meth)acrylic acid, maleic acid, fumeric acid and undecylenic acid. In general formulas I and II, E may initially be a residue of a precursor of a carboxylic acid functional monomer that is converted to a carboxylic acid residue after completion of the controlled radical polymerization, e.g., maleic anhydride, di($C_1$–$C_4$ alkyl) maleates and $C_1$–$C_4$ alkyl (meth)acrylates. For example, residues of maleic anhydride can be converted to diacid residues, ester/acid residues or amide/acid residues by art-recognized reactions with water, alcohols or primary amines, respectively. Residues of $C_1$–$C_4$ alkyl (meth)acrylates, such as t-butyl methacrylate, can be converted to (meth)acrylic acid residues by art-recognized ester hydrolyzation methods, which typically involve the concurrent removal of an alcohol, such as t-butanol, by vacuum distillation. Salts of carboxylic acid functional monomers of which E may be a residue include, for example, salts of (meth)acrylic acid and primary, secondary or tertiary amines, such as, butyl amine, dimethyl amine and triethyl amine.

Amine functional monomers of which E may be a residue include, for example, amino($C_2$–$C_4$ alkyl) (meth)acrylates, e.g., 2-aminoethyl (meth)acrylate, 3-aminopropyl (meth) acrylate and 4-aminobutyl (meth)acrylate; N—($C_1$–$C_4$ alkyl)amino($C_2$–$C_4$ alkyl) (meth)acrylates, e.g., N-methyl-2-aminoethyl (meth)acrylate; and N,N-di($C_1$–$C_4$ alkyl) amino($C_2$–$C_4$ alkyl) (meth)acrylates, e.g., N,N-dimethyl-2-aminoethyl (meth)acrylate. The —(E)$_s$— segments of general formulas I and II may also comprise residues of salts of amine functional monomers, e.g., salts of those amine functional monomers as recited previously herein. Salts of the amine functional monomer residues may be formed by mixing a carboxylic acid, e.g., lactic acid, with the pigment dispersant after completion of controlled radical polymerization.

In an embodiment of the present invention, E is a residue of carboxylic acid functional monomers selected from (meth)acrylic acid, maleic anhydride, maleic acid, di($C_1$–$C_4$ alkyl) maleates, and mixtures thereof. In a still further embodiment of the present invention, E is a residue of amine functional monomers selected from amino($C_2$–$C_4$ alkyl) (meth)acrylates, N—($C_1$–$C_4$ alkyl)amino($C_2$–$C_4$ alkyl) (meth)acrylates, N,N-di($C_1$–$C_4$ alkyl)amino($C_2$–$C_4$ alkyl) (meth)acrylates and mixtures thereof.

Residue E of general formulas I and II may also contain cationic moieties selected from ammonium, sulphonium and phosphonium. Ammonium, sulphonium and phosphonium moieties may be introduced into the pigment dispersant by means known to the skilled artisan. For example, when E is a residue of N,N-dimethyl-2-aminoethyl (meth)acrylate, the N,N-dimethylamino moieties may be converted to ammonium moieties by mixing an acid, e.g., lactic acid, with the pigment dispersant.

When the —(E)$_s$— segments of the pigment dispersant contain residues of oxirane functional monomers, such as glycidyl (meth)acrylate, the oxirane groups may be used to introduce sulphonium or phosphonium moieties into the pigment dispersant. Sulphonium moieties may be introduced into the pigment dispersant by reaction of the oxirane groups with thiodiethanol in the presence of an acid, such as lactic acid. Reaction of the oxirane groups with a phosphine, e.g., triphenyl phosphine or tributyl phosphine, in the presence of an acid, such as lactic acid, results in the introduction of phosphonium moieties into the pigment dispersant.

Each of G and E in general formulas I and II may represent one or more types of monomer residues, while p and s represent the average total number of G and E residues occurring per block or segment of G residues (G-block or G-segment) and E residues (E-block or E-segment) respectively. When containing more than one type or species of monomer residue, the G- and E-blocks may each have at least one of random, block (e.g., di-block and tri-block), alternating and gradient architectures. Gradient architecture refers to a sequence of different monomer residues that changes gradually in a systematic and predictable manner along the polymer backbone. For purposes of illustration, a G-block containing 6 residues of 2-ethylhexyl methacrylate (EHM) and 6 residues of an adduct of glycidyl methacrylate and p-nitrobenzoic acid (GNBA), for which p is 12, may have di-block, tetra-block, alternating and gradient architectures as represented in general formulas VI, VII, VIII and IX.

Di-Block Architecture-(EHM-EHM-EHM-EHM-EHM-EHM-GNBA-GNBA-GNBA-GNBA-GNBA-GNBA)-     VI Tetra-Block Architecture-(EHM-EHM-EHM-GNBA-GNBA-GNBA-EHM-EHM-EHM-GNBA-GNBA-GNBA)-     VII Alternating Architecture-(EHM-GNBA-EHM-GNBA-EHM-GNBA-EHM-GNBA-EHM-GNBA-EHM-GNBA)-     VIII Gradient Architecture-(EHM-EHM-EHM-GNBA-EHM-EHM-GNBA-GNBA-EHM-GNBA-GNBA-GNBA)-     IX The E-block may be described in a manner similar to that of the G-block.

The order in which monomer residues occur along a polymeric segment of the pigment dispersant is typically determined by the order in which the corresponding monomers are fed into the vessel in which the controlled radical polymerization is conducted. For example, the monomers that are incorporated as residues in the G-blocks of the pigment dispersant represented by general formula I are generally fed into the reaction vessel prior to those monomers that are incorporated as residues in the E-blocks.

During formation of the G- and E-blocks, if more than one monomer is fed into the reaction vessel at a time, the relative reactivities of the monomers typically determines the order in which they are incorporated into the living polymer arms of the pigment dispersant. Gradient sequences of monomer residues within the G- and E-blocks can be prepared by controlled radical polymerization, and in particular by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937 at column 29, line 29 through column 31, line 35.

Subscripts p and s represent average numbers of residues occurring in the respective G and E blocks. Typically, subscripts p and s are each independently a number of at least 1, and preferably at least 3 for general formulas I and II. Also, subscripts p and s may be each independently a number of less than 100, preferably less than 80, and more preferably less than 50 (e.g., 20 or less) for general formulas I and II. The value of subscripts p and s may each range independently between any combination of these values, inclusive of the recited values, e.g., p and s may each independently be a number from 1 to 100.

The pigment dispersant typically has a number average molecular weight (Mn) of from 500 to 100,000, e.g., from 5000 to 50,000 or from 8000 to 25,000, as determined by gel permeation chromatography using polystyrene standards. The polydispersity index (i.e., weight average molecular weight (Mw) divided by Mn) of the pigment dispersant is typically less than 2.0, e.g., less than 1.8 or less than 1.5.

In an embodiment of the present invention, z of general formulas I and II is 2, and the pigment dispersant may have a polymer chain structure selected from at least one of the following representative general formulas X and XI,

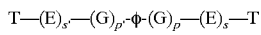

and

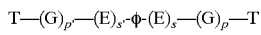

In general formula IX and X, T, E, G, φ, s and p have the same meanings as described previously herein. Subscripts p' and s' represent average numbers of residues occurring in a block of residues, and p, p', s and s' are each selected independently for each structure such that the pigment dispersant has a number average molecular weight of at least 500. Monomers of which G and E may be residues of in general formulas X and XI may be selected from those respective examples as described previously herein. Subscripts p, p', s and s' in general formulas X and XI may each be selected independently for each structure from those values as recited previously herein for p and s with regard to general formulas I and II, for example, p, p', s and s' may each be independently for each structure numbers from 1 to 100.

Symbol φ of general formulas I, II, X and XI is or is derived from the residue of the monomeric initiator used in the preparation of the pigment dispersant by controlled radical polymerization, and is free of the radically transferable groups of the initiator. For example, when the pigment dispersant is initiated in the presence of para-di(bromomethyl)benzene, the symbol φ, more specifically -φ-, is the p-xylylene residue,

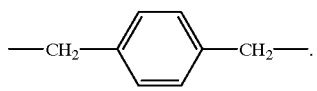

Symbol φ may be derived from the residue of the monomeric initiator. For example, φ may be derived from an initiator residue having functional groups, such as epoxide groups, that are further reacted, e.g., hydrolyzed, after completion of the controlled radical polymerization of the pigment dispersant.

In general formulas I, II, X and XI, T is or is derived from the radically transferable group of the ATRP initiator. The residue of the radically transferable group may be (a) left on the pigment dispersant, (b) removed or (c) chemically converted to another moiety. The radically transferable group may be removed by substitution with a nucleophilic compound, e.g., an alkali metal alkoxylate. When the residue of the radically transferable group is, for example, a cyano group (—CN), it can be converted to an amide group or carboxylic acid group by methods known in the art.

In a preferred embodiment of the present invention, the radically transferable group is a halide, which can be removed from the pigment dispersant by means of a mild dehalogenation reaction. The reaction is typically performed as a post-reaction after the pigment dispersant has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen containing pigment dispersant with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound).

Not intending to be bound by any theory, it is believed, based on the evidence at hand, that the reaction between the halogen containing pigment dispersant and one or more LRPEU compounds results in (1) removal of the halogen group, and (2) the addition of at least one carbon-carbon double bond where the carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of halogen present in the pigment dispersant. When added in excess of a stoichiometric amount, the LRPEU compound is typically present in an amount of no greater than 5 mole percent, e.g., 1 to 3 mole percent, in excess of the total moles of halogen.

Limited radically polymerizable ethylenically unsaturated compounds useful for dehalogenating the pigment dispersant under mild conditions include those represented by the following general formula XII.

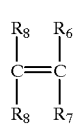

XII

In general formula XII, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the pigment dispersant and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between the halogen containing pigment dispersant and an LRPEU compound, e.g., alpha-methyl styrene, is summarized in the following general scheme 1.

General Scheme 1

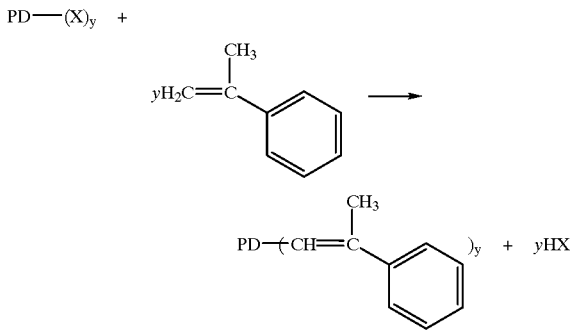

In general scheme 1, PD—(X)$_y$ represents the halogen containing pigment dispersant, and y is the number of halogens on the pigment dispersant.

The pigment dispersant (c) is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, preferably less than 40 percent by weight, and more preferably less than 25 percent by weight, based on the total weight of the pigment dispersion. The amount of pigment dispersant (c) present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments; and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetra-chloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment (a) is typically present in the pigment dispersion of the present invention in an amount of at least 0.5 percent by weight, preferably at least 5 percent by weight, and more preferably at least 20 percent by weight, based on the total weight of the pigment dispersion. The pigment is also typically present in the pigment dispersion in an amount of less than 90 percent by weight, preferably less than 80 percent by weight, and more preferably less than 75 percent by weight, based on the total weight of the pigment dispersion. The amount of pigment present in the pigment dispersion may range between any combination of these values, inclusive of the recited values.

The pigment (a) and pigment dispersant (c) are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment (a) to pigment dispersant (c) is typically from 0.1:1 to 100:1, e.g., from 0.2:1 to 5:1 or from 0.5:1 to 2:1.

The pigment dispersion of the present invention also comprises an aqueous carrier selected from water and a mixture of water and at least one organic solvent (preferably a water soluble organic solvent). Classes of organic solvents that may be present in the aqueous carrier include, but are not limited to, alcohols, e.g., methanol, ethanol, n-propanol, iso-propanol, n-butanol, sec-butyl alcohol, tert-butyl alcohol, iso-butyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexanetriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

When the aqueous carrier comprises a mixture of water and organic solvent, the aqueous carrier typically contains from 30 to 95 percent by weight of water, and from 5 to 70 percent by weight of organic solvent, e.g., from 60 to 95 percent by weight of water, and from 5 to 40 percent by weight of organic solvent. The percent weights are based on the total weight of the aqueous carrier.

The aqueous carrier (b) is typically present in the pigment dispersion of the present invention, in an amount of at least 5 percent by weight, preferably at least 15 percent by weight, and more preferably at least 30 percent by weight, based on the total weight of the pigment dispersion. The aqueous carrier is also typically present in the pigment dispersion in an amount of less than 99.4 percent by weight, preferably less than 80 percent by weight, and more preferably less than 60 percent by weight, based on the total weight of the pigment dispersion. The amount of aqueous carrier present in the pigment dispersion may range between any combination of these values, inclusive of the recited values.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coatings compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

Synthesis Examples A–C

Synthesis Examples A through C describe the preparation of a pigment dispersant that is used to prepare a pigment dispersion according to the present invention as described in the Pigment Dispersion Example.

EXAMPLE A

A monomeric initiator having 4 radically transferable groups was prepared from the ingredients as enumerated in the following Table A. The monomeric initiator of Example A was used in the controlled radical polymerization of Example B.

TABLE A

| Ingredients | Parts by weight |
| --- | --- |
| Charge 1 | |
| di-trimethylolpropane | 60 |
| imidazole | 72 |
| tetrahydrofuran | 600 |
| Charge 2 | |
| 2-bromoisobutyryl bromide | 243 |
| Charge 3 | |
| deionized water | 300 |

Charge 1 was added to a 2 liter 4-necked flask equipped with a motor driven poly(tetrafluoroethylene) stir blade, water cooled condenser, and a heating mantle and thermometer connected through a temperature feed-back control device. The contents of the flask were cooled to 15° C. With continuous stirring, Charge 2 was added to the flask over a period of 55 minutes, during which time the contents of the flask were observed to exotherm to a temperature of 55° C. With the completion of the addition of Charge 2, the contents of the flask were heated to and held at 60° C. for 4 hours. Upon cooling the contents of the flask to ambient room temperature Charge 3 was added to the flask. The contents of the flask were transferred to a separatory funnel, the retained organic layer was dried over calcium sulfate and tetrahydrofuran was removed from by vacuum distillation.

EXAMPLE B

A polymer was prepared by controlled radical polymerization from the ingredients as enumerated in the following Table B. The polymer of Example B was modified to form a pigment dispersant as described in Example C.

TABLE B

| Ingredients | Parts by weight |
| --- | --- |
| Charge 1 | |
| toluene | 60.0 |
| copper powder (a) | 0.64 |
| 2,2'-bipyridyl | 0.78 |
| Charge 2 | |
| monomeric initiator of Example A | 10.6 |
| iso-butyl methacrylate monomer | 85.3 |
| Charge 3 | |
| glycidyl methacrylate monomer | 21.3 |
| toluene | 25.0 |
| Charge 4 | |
| MPEG 550 MA monomer (b) | 242.9 |
| toluene | 150.0 |
| Charge 5 | |
| magnesium silicate (c) | 100.0 |

(a) The copper powder had an average particle size of 25 microns, a density of 1 gram/cm$^3$, and was obtained commercially from OMG Americas.
(b) MPEG 550 MA monomer is a methoxy poly(ethylene glycol) methacrylate monomer from Sartomer Company, Inc.
(c) MAGNESOL synthetic magnesium silicate obtained commercially from The Dallas Group of America.

Charge 1 was added under a continuous nitrogen sweep to a 1 liter 4-necked flask equipped with a motor driven stainless steel stir blade, water cooled condenser, and a heating mantle and thermometer connected through a temperature feed-back control device. With stirring, Charge 2 was added to the flask at ambient room temperature, followed by heating to and holding at 85° C. for 3 hours. The contents of the flask were cooled to 80° C., and Charge 3 was added over a period of 15 minutes, followed by a 1.75 hour hold at 80° C. After cooling the contents of the flask to 70° C., Charge 4 was added over a period of 40 minutes, followed by a 4 hour hold at 70° C. Charge 5 was then added, and the contents of the flask were passed through a filter-press packed with MAGNESOL synthetic magnesium silicate. The filtered resin was then vacuum stripped, and the solids of the resin was adjusted to 70 percent by weight, based on total weight, by the addition of methyl 2-hydroxypropyl ether.

The polymer of Example B was found to have: Mn=15,130; Mw=20,445; z average molecular weight (Mz)=27,330; and a polydispersity index (PDI) (i.e., Mw/Mn)=1.35.

EXAMPLE C

A pigment dispersant useful in the pigment dispersions of the present invention was prepared from the polymer of Example B using the ingredients as enumerated in Table C.

TABLE C

| Ingredients | Parts by weight |
| --- | --- |
| polymer to Example B (d) | 350 |
| para-nitrobenzoic acid | 8.2 |
| ethyltriphenylphosphonium iodide catalyst | 0.54 |

(d) 70 percent by weight, based on total weight.

The ingredients listed in Table C were added to a 1 liter round bottom flask equipped with a motor driven stainless steel stir blade, water cooled reflux condenser, and a heating mantle and thermometer connected through a temperature feed-back control device. The contents of the flask were heated to and held at 110° C. for 10 hours. Upon cooling to room temperature, the contents of the flask were mixed with deionized water to form an aqueous composition having a resin solids content of 17.8 percent by weight, based on total weight.

Pigment Dispersion Example

A pigment dispersion according to the present invention, was prepared using the ingredients enumerated in Table 1.

TABLE 1

| Ingredients | Parts by weight |
|---|---|
| pigment dispersant of Example C | 176 |
| defoamer (e) | 1.0 |
| deionized water | 97 |
| chlorinated copper phthalocyanine blue pigment (f) | 63 |
| aqueous dimethylethanolamine (g) | 11 |

(e) BYK 031 defoamer from Byk-Chemie.
(f) B-4816 Palomar Blue chlorinated copper phthalocyanine blue pigment obtained from Bayer.
(g) 50 percent by weight dimethylethanolamine in deionized water.

The pigment dispersant of Example C, defoamer and deionized water were mixed in a stainless steal beaker using a cowles blade for approximately 10 minutes. The chlorinated copper phthalocyanine blue pigment was added to the stainless steal beaker with agitation from the cowles blade. The pH of the contents of the stainless steal beaker was adjusted to a value of 9 by addition of the aqueous dimethylethanolamine, followed by 15 minutes of additional mixing with the cowles blade to form a pre-paste. The pre-paste was then transferred to and ground in an Eiger Mini Motormill 100 (from Eiger Machine, Inc. of Chicago, Ill.). During the grinding process, the temperature of the contents of mill did not rise above 30° C. The pigment dispersion was removed from the mill and had a pigment to binder ratio of 2, and a solids weight of 27.3 percent by weight based on the total weight of the pigment dispersion.

The pigment dispersion was found to have a mean particle size of 1.356 microns (as determined using a Coulter LS 230 Particle Size Analyzer from Beckman Coulter Corporation), and a haze value of 4 percent (as determined using a TCS Plus Spectrophotometer Model 8870 from Byk-Gardner). Mean particle sizes of less than 2 microns and haze values of less than 25 percent are considered generally to be desirable for aqueous pigment dispersions of chlorinated copper phthalocyanine blue pigment having a pigment to binder ratio of 2 and a solids content of approximately 40 percent by weight, based on total weight.

The present invention has been described with reference to specific details of particular embodiments thereof. It is not intended that such details be regarded as limitations upon the scope of the invention except insofar as and to the extent that they are included in the accompanying claims.

We claim:

1. A pigment dispersion comprising:
   (a) pigment;
   (b) an aqueous carrier selected from water and a mixture of water and at least one organic solvent; and
   (c) a pigment dispersant prepared by controlled radical polymerization in the presence of a monomeric initiator having at least two radically transferable groups, and in which said pigment dispersant has at least one of the following polymer chain structures,

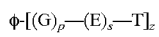

and

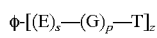

wherein G is a hydrophobic residue of at least one radically polymerizable ethylenically unsaturated monomer; E is a hydrophilic residue of at least one radically polymerizable ethylenically unsaturated monomer; φ is a residue of or derived from said initiator, and is free of said radically transferable group; T is or is derived from said radically transferable group of said initiator; z is independently for each structure a number from 2 to 10; p and s represent average numbers of residues occurring in a block of residues; p and s are each at least one and are selected independently for each structure such that said pigment dispersant has a number average molecular weight of at least 500.

2. The pigment dispersion of claim 1 wherein said pigment dispersant is prepared by atom transfer radical polymerization and has a polydispersity index of less than 2.0, and said initiator is selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having at least two radically transferable groups.

3. The pigment dispersion of claim 2 wherein the radically transferable groups of said initiator are selected from the group consisting of halides.

4. The pigment dispersion of claim 3 wherein said polyol is selected from the group consisting of alkylene glycol, di-penta(alkylene glycols), trimethylolpropane, trimethylolethane, di-trimethylolpropane, di-trimethylolethane, pentaerythritol, di-pentaerythritol and mixtures thereof, $R_3$ and $R_4$ are each independently selected from hydrogen and a $C_1$–$C_4$ alkyl group, and X is chlorine or bromine.

5. The pigment dispersion of claim 1 wherein G and E are each residues of monomers independently selected from the group consisting of vinyl monomers, allylic monomers, olefins and mixtures thereof.

6. The pigment dispersion of claim 5 wherein G is a residue of a monomer selected from the group consisting of: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates; aromatic (meth)acrylates; polycyclicaromatic (meth)acrylates; vinyl esters of carboxylic acids; N,N-di($C_1$–$C_8$ alkyl) (meth)acrylamides; maleimide; N-($C_1$–$C_{20}$ alkyl) maleimides; N-($C_3$–$C_8$ cycloalkyl) maleimides; N-(aryl) maleimides; and mixtures thereof.

7. The pigment dispersion of claim 6 wherein said oxirane functional monomer is selected from the group consisting of glycidyl (meth)acrylate, 3,4-epoxycyclohexylmethyl(meth)acrylate, 2-(3,4-epoxycyclohexyl)ethyl(meth)acrylate, allyl glycidyl ether and mixtures thereof; and said carboxylic acid is selected from the group consisting of para-nitrobenzoic acid, hexanoic acid, 2-ethyl hexanoic acid, decanoic acid, undecanoic acid and mixtures thereof.

8. The pigment dispersion of claim 5 wherein E has nonionic moieties, ionic moieties and combinations thereof.

9. The pigment dispersion of claim 8 wherein E is a residue of a monomer selected from the group consisting of poly(alkylene glycol) (meth)acrylates, $C_1$–$C_4$ alkoxy poly(alkylene glycol) (meth)acrylates, hydroxyalkyl (meth)acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

10. The pigment dispersion of claim 9 wherein the carboxylic acid functional monomers are selected from the group consisting of (meth)acrylic acid, maleic anhydride, maleic acid and mixtures thereof; and the amine functional monomers are selected from the group consisting of amino ($C_2$–$C_4$ alkyl) (meth)acrylates, N—($C_1$–$C_4$ alkyl)amino ($C_2$–$C_4$ alkyl) (meth)acrylates, N,N-di($C_1$–$C_4$ alkyl)amino ($C_2$–$C_4$ alkyl) (meth)acrylates and mixtures thereof.

11. The pigment dispersion of claim 8 wherein E has cationic moieties selected from the group consisting of ammonium, sulphonium and phosphonium.

12. The pigment dispersion of claim 1 wherein p and s are each independently a number from 1 to 100, and said pigment dispersant has a polydispersity of less than 1.8.

13. The pigment dispersion of claim 2 wherein T is derived from a dehalogenation post-reaction.

14. The pigment dispersion of claim 13 wherein said dehalogenation post-reaction comprises contacting said polymeric dispersant with a limited radically polymerizable ethylenically unsaturated compound.

15. The pigment dispersion of claim 14 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

16. The pigment dispersion of claim 1 wherein the hydrophilic polymer chain segment —(E)$_s$— of said pigment dispersant has a calculated average value of 100×(oxygen weight+nitrogen weight)/carbon weight of from 55 to 133; and the hydrophobic polymer chain segment —(G)$_p$— of said pigment dispersant has a calculated average value of 100×(oxygen weight+nitrogen weight)/carbon weight of from 10 to less than 55.

17. The pigment dispersion of claim 1 wherein pigment (a) is selected from the group consisting of inorganic pigments, organic pigments and mixtures thereof.

18. The pigment dispersion of claim 1 wherein pigment (a) and said pigment dispersant (c) are together present in an amount of from 20 percent by weight to 80 percent by weight, based the total weight of said pigment dispersion.

19. The pigment dispersion of claim 18 wherein the weight ratio of pigment (a) to said pigment dispersant (c) is from 0.1:1 to 100:1.

20. The pigment dispersion of claim 1 wherein pigment (a) is present in an amount of from 0.5 percent to 90 percent by weight, based on total weight of said pigment dispersion, said aqueous carrier (b) is present in an amount of from 5 percent to 99.4 percent by weight, based on total weight of said pigment dispersion, and said pigment dispersant (c) is present in an amount of from 0.1 percent to 65 percent by weight, based on total weight of said pigment dispersion.

21. The pigment dispersion of claim 2 wherein z is 2 and said pigment dispersant has at least one of the following polymer chain structures,

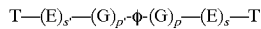

and

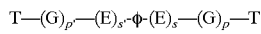

wherein p' and s' represent average numbers of residues occurring in a block of residues; and p, p', s and s' are each selected independently for each structure such that said pigment dispersant has a number average molecular weight of at least 500.

22. The pigment dispersion of claim 21 wherein said initiator is selected from the group consisting of methylenedihalide, di-(-halo-$C_1$–$C_6$-alkyl)benzene, 2,2-bis (halomethyl)-1,3-dichloropropane, $C_1$–$C_6$ linear or branched alkyl ester of alpha-polyhalo $C_2$–$C_6$ carboxylic acid, an initiator represented by the following general formula,

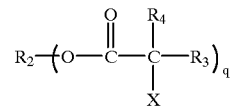

for which $R_2$ is the residue of a diol, X is a halide, $R_3$ and $R_4$ are each independently selected from the group consisting of hydrogen, $C_1$–$C_{20}$ linear or branched alkyl groups, aryl groups and polycyclic aromatic groups, and q is 2, and mixtures of such initiators.

23. The pigment dispersion of claim 22 wherein G is a residue of a monomer selected from the group consisting of: oxirane functional monomer reacted with a carboxylic acid selected from the group consisting of aromatic carboxylic acids, polycyclic aromatic carboxylic acids, aliphatic carboxylic acids having from 6 to 20 carbon atoms and mixtures thereof; $C_6$–$C_{20}$ alkyl (meth)acrylates; aromatic (meth) acrylates; polycyclicaromatic (meth)acrylates; vinyl esters of carboxylic acids; N,N-di($C_1$–$C_8$ alkyl) (meth) acrylamides; maleimide; N—($C_1$–$C_{20}$ alkyl) maleimides; N—($C_3$–$C_8$ cycloalkyl) maleimides; N-(aryl) maleimides; and mixtures thereof; and E has nonionic moieties, ionic moieties and combinations there of.

24. The pigment dispersion of claim 23 wherein E is a residue of a monomer selected from the group consisting of poly(alkylene glycol) (meth)acrylates, $C_1$–$C_4$ alkoxy poly (alkylene glycol) (meth)acrylates, hydroxyalkyl (meth) acrylates having from 2 to 4 carbon atoms in the alkyl group, N-(hydroxy $C_1$–$C_4$ alkyl) (meth)acrylamides, N,N-di-(hydroxy $C_1$–$C_4$ alkyl) (meth)acrylamides, carboxylic acid functional monomers, salts of carboxylic acid functional monomers, amine functional monomers, salts of amine functional monomers and mixtures thereof.

25. The pigment dispersion of claim 24 wherein p, p', s and s' are each independently numbers from 1 to 100.

26. The pigment dispersion of claim 2 wherein said initiator is selected from the group consisting of methylenediahalide, haloform, carbon tetrahalide, di-hexakis(α-halo-$C_1$–$C_6$-alkyl)benzene, 2,2-bis (halomethyl)-1,3-dihalopropane, C1–C6 linear or branched alkyl ester of alpha-polyhalo $C_2$–$C_6$ carboxylic acid, an initiator represented by the following general formula,

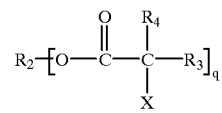

for which $R_2$ is the residue of a polyol having from 2 to 10 hydroxy groups, X is halide, $R_3$ and $R_4$ are each independently selected from the group consisting of hydrogen, $C_1$–$C_{20}$ linear or branched alkyl groups, aryl groups and polycyclic aromatic groups of said polyol, and mixtures of such initiators.

* * * * *

UNITED STATES PATENT AND TRADEMARK OFFICE
CERTIFICATE OF CORRECTION

PATENT NO.   : 6,326,420 B1                                       Page 1 of 1
DATED        : December 4, 2001
INVENTOR(S)  : Olson et al.

It is certified that error appears in the above-identified patent and that said Letters Patent is hereby corrected as shown below:

<u>Title page,</u>
Item [57], ABSTRACT,
Line 9, delete the formula "$\Phi - [ (E)_3 - (G)_p - T ]_z$" and replace it with
-- $\Phi - [ (E)_s - (G)_p - T ]_z$ --.

<u>Column 18,</u>
Line 23, delete the word "nitrites" and insert -- nitriles --.

<u>Column 20,</u>
Line 6, delete "di - ( -halo-$C_1$-$C_6$-alkyl) benzene" and insert -- di - ($\alpha$ - halo-$C_1$-$C_6$-alkyl) benzene --.

Signed and Sealed this

Twentieth Day of August, 2002

*Attest:*

*Attesting Officer*

JAMES E. ROGAN
*Director of the United States Patent and Trademark Office*